(12) United States Patent
Ma et al.

(10) Patent No.: US 10,855,557 B2
(45) Date of Patent: Dec. 1, 2020

(54) METHOD AND DEVICE FOR UPGRADING VIRTUAL SWITCH

(71) Applicant: ALIBABA GROUP HOLDING LIMITED, George Town (KY)

(72) Inventors: Jieyue Ma, Hangzhou (CN); Xiaoyun Mao, Hangzhou (CN); Zheng Liu, Hangzhou (CN)

(73) Assignee: Alibaba Group Holding Limited, George Town (KY)

(*) Notice: Subject to any disclaimer, the term of this patent is extended or adjusted under 35 U.S.C. 154(b) by 0 days.

(21) Appl. No.: 16/398,112

(22) Filed: Apr. 29, 2019

(65) Prior Publication Data
US 2019/0253326 A1 Aug. 15, 2019

Related U.S. Application Data

(63) Continuation of application No. PCT/CN2017/106258, filed on Oct. 16, 2017.

(30) Foreign Application Priority Data
Oct. 28, 2016 (CN) .......................... 2016 1 0973938

(51) Int. Cl.
*G06F 15/177* (2006.01)
*H04L 12/24* (2006.01)
(Continued)

(52) U.S. Cl.
CPC .......... *H04L 41/5025* (2013.01); *G06F 8/656* (2018.02); *G06F 9/45558* (2013.01);
(Continued)

(58) Field of Classification Search
CPC ............. H04L 41/5025; H04L 41/0846; H04L 41/082; H04L 41/0873; H04L 41/0856;
(Continued)

(56) References Cited

U.S. PATENT DOCUMENTS 8,943,490 B1* 1/2015 Jain .................... H04Q 3/54516 717/168
9,513,970 B2* 12/2016 Kapadia .............. H04L 12/4625
(Continued)

FOREIGN PATENT DOCUMENTS

CN 101217678 A 7/2008
CN 101387976 A 3/2009
(Continued)

OTHER PUBLICATIONS

First Chinese Search Report issued in corresponding Chinese Application No. 201610973938.0 dated May 20, 2020 (2 pages).
(Continued)

*Primary Examiner* — Richard G Keehn
(74) *Attorney, Agent, or Firm* — Finnegan, Henderson, Farabow, Garrett & Dunner LLP

(57) ABSTRACT

Embodiments of the present disclosure provide a method and device for upgrading a virtual switch. The virtual switch includes an old module, and the old module includes a static configuration and dynamic information. The method includes: loading a new module on the virtual switch, synchronizing a static configuration of the new module with the static configuration of the old module, recording, in a process where the dynamic information of the old module constantly changes, the changing dynamic information of the old module, synchronizing the changing dynamic information of the old module to the new module, and sending, when network traffic is received on the virtual switch, the network traffic to the new module to which the static configuration and the dynamic information of the old module have been synchronized.

20 Claims, 13 Drawing Sheets

(51) Int. Cl.
  *H04L 29/08* (2006.01)
  *G06F 9/455* (2018.01)
  *H04L 12/931* (2013.01)
  *G06F 8/656* (2018.01)

(52) U.S. Cl.
  CPC .......... *H04L 41/082* (2013.01); *H04L 41/084* (2013.01); *H04L 41/0836* (2013.01); *H04L 41/0846* (2013.01); *H04L 41/0856* (2013.01); *H04L 41/0873* (2013.01); *H04L 49/65* (2013.01); *H04L 67/1095* (2013.01); *H04L 67/146* (2013.01); *G06F 2009/45595* (2013.01); *H04L 49/70* (2013.01)

(58) Field of Classification Search
  CPC ... H04L 41/0836; H04L 41/084; H04L 49/65; H04L 49/70; H04L 67/146; H04L 67/1095; G06F 9/45558; G06F 2009/45595; G06F 8/656
  See application file for complete search history.

(56) References Cited

U.S. PATENT DOCUMENTS

| | | | |
|---|---|---|---|
| 2010/0036995 A1* | 2/2010 | Nakayama | G06F 13/4022 710/316 |
| 2011/0131361 A1* | 6/2011 | Itakura | G06F 11/2033 710/313 |
| 2011/0274114 A1* | 11/2011 | Dhar | H04L 12/56 370/401 |
| 2012/0320918 A1* | 12/2012 | Fomin | H04L 12/4625 370/392 |
| 2013/0064133 A1* | 3/2013 | Ritz | H04L 49/70 370/254 |
| 2013/0262647 A1* | 10/2013 | Kurita | G06F 9/54 709/223 |
| 2014/0181984 A1 | 6/2014 | Kundu et al. | |
| 2015/0163196 A1 | 6/2015 | Bhagwat et al. | |
| 2016/0274926 A1 | 9/2016 | Narasimhamurthy et al. | |

FOREIGN PATENT DOCUMENTS

| | | | |
|---|---|---|---|
| CN | 102694672 A | | 9/2012 |
| CN | 102761615 A | | 10/2012 |
| CN | 103930873 A | | 7/2014 |
| CN | 107493180 A | * | 12/2017 |
| CN | 109861839 A | * | 6/2019 |
| WO | WO2018077052 A1 | | 5/2018 |

OTHER PUBLICATIONS

First Chinese Office Action issued in Chinese Application No. 201610973938.0 dated Jun. 1, 2020, 8 pages.
International Preliminary Report on Patentability and PCT International Search Report and Written Opinion dated Apr. 30, 2019, issued in corresponding International Application No. PCT/CN2017/106258 (19 pgs.).

* cited by examiner

```
Avs2:
for each session in avs1.table; do
    set_bit(bitmap, session, dirty)
bitmap.dirty_num > threshold; do
    for each bit in bitmap; do
        if bit id dirty:
            copy_session(avs2.table, avs1.table, bitmap, bit)
            clear_bit(bitmap, bit)
cache_packet()
packet_hook = avs2.hook
start_packet_handler()

Avs1:
Session_packet_handler(session, pkt {
    set_bit(bitmap, session, dirty)
    others
}
```

FIG. 7

| Network session 1 | Network session 2 | Network session 3 | Network session 4 |
|---|---|---|---|
| 1 | 1 | 1 | 1 |

FIG. 8A

| Network session 1 | Network session 2 | Network session 3 | Network session 4 |
|---|---|---|---|
| 0 | 0 | 0 | 0 |

FIG. 8B

| Network session 1 | Network session 2 | Network session 3 | Network session 4 |
|---|---|---|---|
| 0 | 1 | 0 | 1 |

FIG. 8C

| Network session 1 | Network session 2 | Network session 3 | Network session 4 |
|---|---|---|---|
| 0 | 0 | 0 | 0 |

FIG. 8D

METHOD AND DEVICE FOR UPGRADING VIRTUAL SWITCH

CROSS-REFERENCE TO RELATED APPLICATIONS

The present disclosure the benefits of priority to International Application No. PCT/CN 2017/106258, filed on Oct. 16, 2017, which claims priority to Chinese Patent Application No. 201610973938.0, filed on Oct. 28, 2016, both of which are incorporated herein by reference in their entireties.

TECHNICAL FIELD

The present disclosure relates to the field of virtual machine technologies, and particularly to a method and device for upgrading a virtual switch.

BACKGROUND

With rapid development of the Internet technology in recent years, network virtualization has received extensive attention. In a network virtualization environment, virtual switches are core components. Virtual machines need to send and receive network packets through the virtual switches. The virtual switch can also perform corresponding processing for different virtual machines and different network services, for example, network packet access control, network packet rate limit control, security group, firewall, network address translation, elastic IP, and other network services.

Referring to FIG. 1, which is a schematic diagram of an exemplary virtual machine network having virtual machines (VMs) connected with virtual switches (VSwitches) through virtual network interface cards (VNICs). When processing a network service, a virtual machine can use its operating system (OS) and applications (APPs) installed thereon to communicate with a virtual switch.

In a cloud computing network (e.g. Alibaba™ Network), virtual switches can work collaboratively with other network elements in a data center, such as other physical switches, high-performance service gateways (e.g., International Gateway (IGW)), Voice GateWay (VGW), Network Address Translation GateWay (NATGW), Multi-Protocol Label Switching GateWay (MPLSGW), cloud service (e.g., Object Storage Service (OSS) and Relational Database Service (RDS)), and network controller, to support complex network services and applications in the cloud computing environment.

FIG. 2 is a schematic diagram of the above described virtualized cloud computing network. As shown in FIG. 2, a virtual network (VM Network) comprises virtual machines and virtual switches. A physical network can include the virtual switches, physical switches, high-performance service gateways, a cloud service, and a network controller. A cloud computing network can include the physical networks. The network elements in the cloud computing network can communicate with each other through the physical networks and can also communicate with the Internet and a user network through the physical networks.

The network elements in the cloud computing network communicate with each other on the physical networks through a tunneling protocol. As shown by double-headed solid arrows in FIG. 2, the virtual switch can communicate with the Internet gateway and the voice gateway through the tunneling protocol, and the voice gateway can communicate with the multi-protocol label switching gateway and the network address translation gateway through the tunneling protocol. In addition, the network controller in the cloud computing network can control the network elements in the cloud computing network. As shown by double-headed dashed arrows in FIG. 2, the network controller can control network elements such as the virtual switches, the Internet gateway, the network address translation gateway, the voice gateway, and the multi-protocol label switching gateway. Because the virtual switch is implemented through software, impact on existing network services needs to be considered during the upgrade. First, during the upgrade, it is appreciated that the network connection of the virtual switch is maintained, and no network packet is lost. Second, if the virtual switch has a security group or firewall service, the existing connection status needs to be maintained. Finally, it is appreciated that the network service configuration of the virtual switch remains unchanged before and after the upgrade. For example, configuration of a firewall rule and a forwarding table are consistent before and after the upgrade.

Meanwhile, to achieve a smooth handoff of a network service of the virtual machine during the upgrade, the network service needs to be maintained, which is considered a hot upgrading method. In other words, processing of network packets continues during the upgrade, causing a change in the existing network connection status. Therefore, during the upgrade, the change in the network connection status can be taken into consideration in the upgraded virtual switch.

For example, the establishment of a Transmission Control Protocol (TCP) connection requires a three-way handshake. Therefore, closing of the TCP connection requires a four-way handshake. The TCP network connection status is a finite-state automaton. For hot upgrade, it is appreciated that all network connection statuses stored in a virtual switch are consistent before and after the upgrade.

In the example of TCP, during the hot upgrade, the virtual machine switch receives a TCP sync packet and attempts to establish a network connection. The TCP sync packet is received and processed by an old module of the virtual switch. After the three-way handshake is completed, an ESTABLISEHED (successful connection state) network connection is generated. Because the network traffic is not switched over to a new module of the virtual switch until the hot upgrade completes the last step, this network connection does not exist in the new module. In this case, if no network connection synchronization is performed, all network packets on this network connection can be discarded after the upgrade is completed.

In an example of open-source virtual switch (Open vSwitch) software, the upgrade of its data plane requires replacement of a datapath module of the virtual switch, causing an interruption of the network connection. This upgrading method is considered a cold upgrading method, which leads to unavailable service and failures to achieve a higher Service-Level Agreement (SLA) service guarantee.

SUMMARY

Embodiments of the present disclosure provide a method for upgrading a virtual switch and a corresponding device for upgrading a virtual switch.

According to some embodiments of the present disclosure, a method for upgrading a virtual switch is provided. The virtual switch comprises a second module, and the second module comprises a static configuration and dynamic information. The dynamic information of the second module changes during the upgrading of the virtual switch. The method includes loading a first module on the virtual switch, synchronizing the static configuration of the second module to the first module, recording the changing dynamic information of the second module, synchronizing the changing dynamic information of the second module to the first module, and in response to the static configuration and the changing dynamic information of the second module having been synchronized to the first module, directing network flows received by the virtual switch to the first module.

In some embodiments, synchronizing the static configuration of the second module to the first module comprises obtaining a current network service configuration of the second module, and synchronizing the current network service configuration of the second module to the first module.

In some embodiments, synchronizing the static configuration of the second module to the first module further comprises in response to a new network service configuration being received by the second module, synchronizing the new network service configuration to the first module.

In some embodiments, the dynamic information includes a network session, and recording the changing dynamic information of the old module includes acquiring the network session of the second module, and recording, in a bitmap, the network session with a first state identifier.

In some embodiments, synchronizing the changing dynamic information of the second module to the first module includes copying the network session with the first state identifier in the bitmap to the first module, and changing, in the bitmap, the first state identifier corresponding to the network session into a second state identifier.

In some embodiments, the bitmap comprises a plurality of recorded network sessions. Recording the changing dynamic information of the second module further includes determining, in the bitmap, the number of network sessions with the first state identifier, determining an accumulated time for synchronizing the dynamic information of the second module to the first module, and in response to at least one of a determination that the number of network sessions with the first state identifier is less than a first preset number or a determination that the accumulated time is equal to or greater than a preset time threshold, buffering one or more network sessions received by the second module.

In some embodiments, the method further includes in response to the number of network sessions with the first state identifier being determined to be greater than or equal to the first number and the synchronization time being determined to be less than the preset time threshold, determining whether the number of network sessions with the first state identifier is greater than a second preset number, and in response to a determination that the number of network sessions with the first state identifier is greater than the second preset number, copying the network sessions with the first state identifier in the bitmap to the first module.

In some embodiments, synchronizing the changing dynamic information of the second module to the first module includes copying all of the network sessions with the first state identifier in the bitmap to the first module, and sending the buffered one or more network sessions to the first module.

In some embodiments, directing network flows received by the virtual switch to the first module includes switching a processing function pointer of the virtual switch to an interface of the first module, and sending the network flows to the first module through the interface.

The embodiments of the present disclosure further provide a device for upgrading a virtual switch. The virtual switch includes a second module, and the second module comprises a static configuration and dynamic information. The dynamic information of the second module changes during the upgrading of the virtual switch. The device can include a memory storing a set of instructions and one or more processors configured to execute the set of instructions to cause the device to perform loading a first module on the virtual switch, synchronizing the static configuration of the second module to the first module, recording the changing dynamic information of the second module, synchronizing the changing dynamic information of the second module to the first module, and in response to the static configuration and the changing dynamic information of the second module having been synchronized to the first module, directing network flows received by the virtual switch to the first module.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure.

FIG. 7 is a schematic diagram of exemplary pseudo-code of network session synchronization, consistent with some embodiments of the present disclosure.

FIG. 8A is a schematic diagram of exemplary network session synchronization of a virtual switch, consistent with some embodiments of the present disclosure.

FIG. 8B is another schematic diagram of exemplary network session synchronization of a virtual switch, consistent with some embodiments of the present disclosure.

FIG. 8C is another schematic diagram of exemplary network session synchronization of a virtual switch, consistent with some embodiments of the present disclosure.

FIG. 8D is another schematic diagram of exemplary network session synchronization of a virtual switch, consistent with some embodiments of the present disclosure.

DETAILED DESCRIPTION

In order to facilitate understanding of the solutions in the present disclosure, the technical solutions in some of the embodiments of the present disclosure are described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Figure 1:
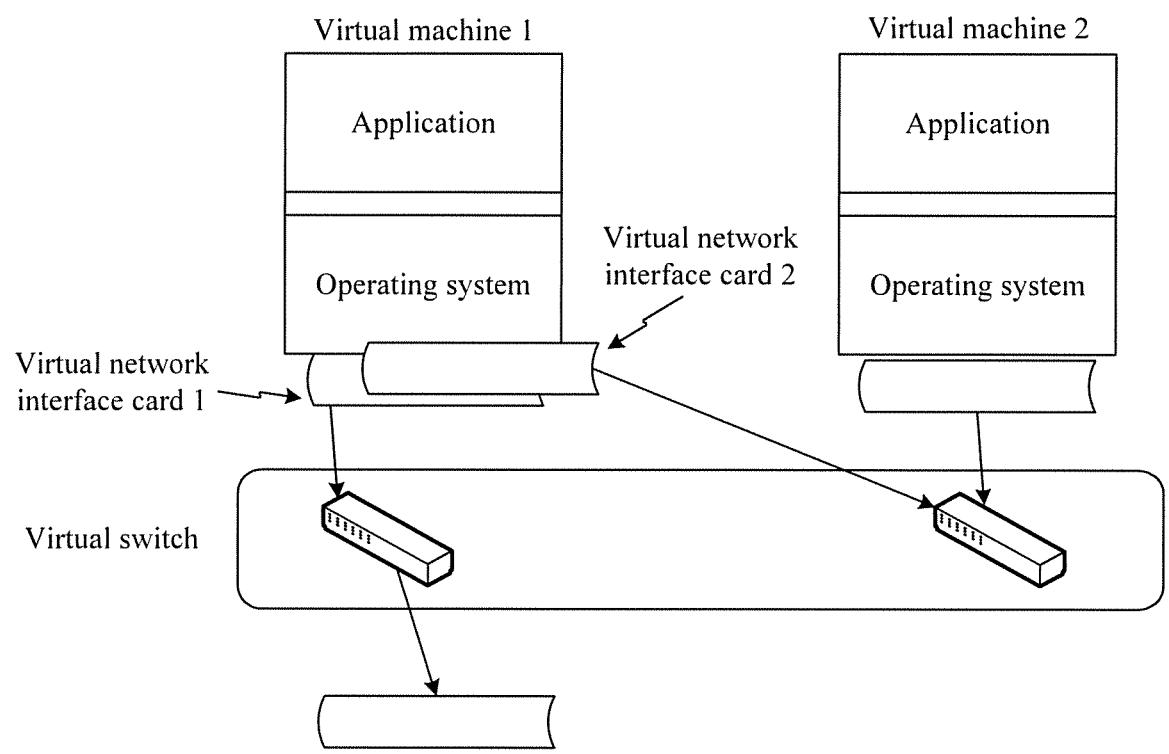
FIG. 1 is a schematic diagram of an exemplary virtual machine network having virtual machines connected with virtual switches.
Figure 2:
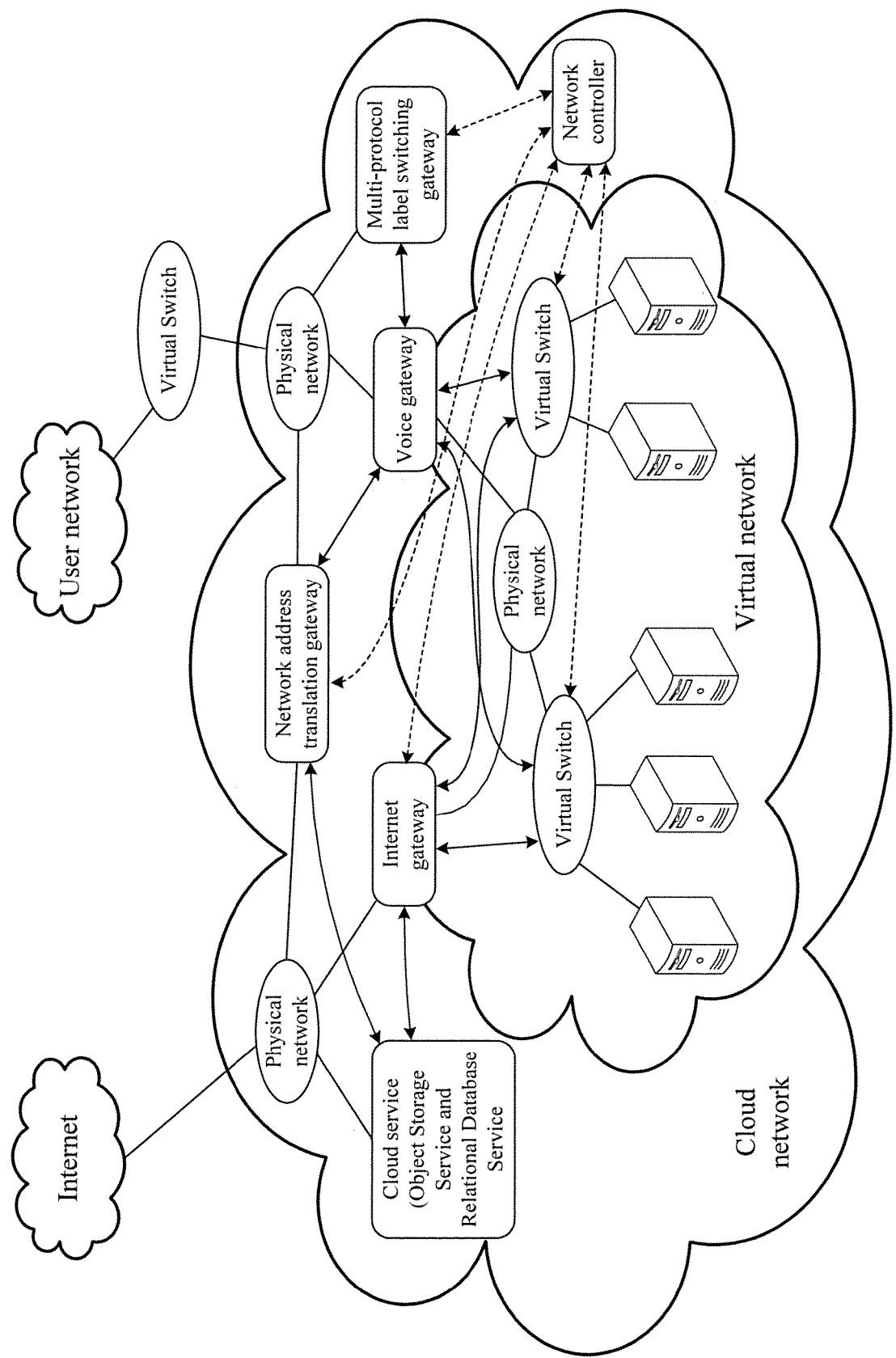
FIG. 2 is a schematic diagram of an exemplary virtualized cloud computing network.
Figure 3:
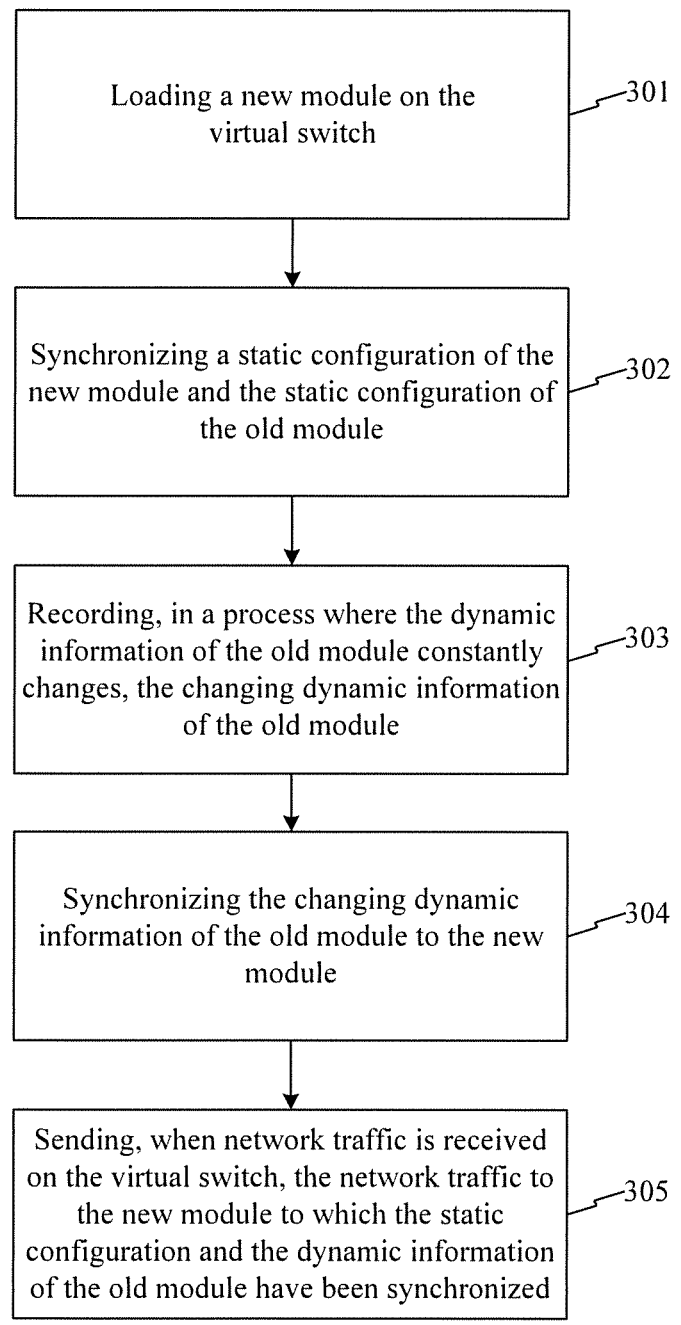
FIG. 3 is a flowchart of an exemplary upgrading method for a virtual switch, consistent with some embodiments of the present disclosure.

FIG. 3 is a flowchart of an exemplary upgrading method for a virtual switch, consistent with some embodiments of the present disclosure. The virtual switch can include an old module. The method can include the following steps.

In Step 301, a new module is loaded on the virtual switch. The virtual switch is a path for connecting a virtual machine and an external physical network of a server, and modules in the virtual switch need to be upgraded periodically to achieve better performance. During the upgrade, an old module in the virtual switch can be replaced with a new module. In one example, the virtual switch can include one or more modules, and only some of the modules can be upgraded. For example, an old datapath module in the virtual switch can be replaced with a new datapath module. The upgrade is transparent and does not affect network services of the virtual machines.

In step 302, a static configuration is synchronized between the new module and the old module.

According to some embodiments of the present disclosure, the entire upgrade process of the virtual switch can be divided into two parts. Using a Linux operating system as an example of the runtime environment below, the virtual switch runs in a system kernel-driven form.

According to some embodiments of the present disclosure, the static configuration can include a network service configuration, and the step 302 can include the following steps.

In step S3021 (not shown in FIG. 3), the network service configuration of the old module is obtained, In step S3022 (not shown in FIG. 3), the network service configuration of the old module is synchronized to the new module.

In some embodiments, the step 302 can further include the following steps.

In step S3023 (not shown in FIG. 3), when a new network service configuration is received, synchronizing the new network service configuration to the new module.

The first part of the upgrade of the virtual switch is a preparation stage. First, consistency between network service configurations of the new module and the old module is implemented. The network service configuration can include a security rule, a firewall rule, and a routing table.

Figure 4:
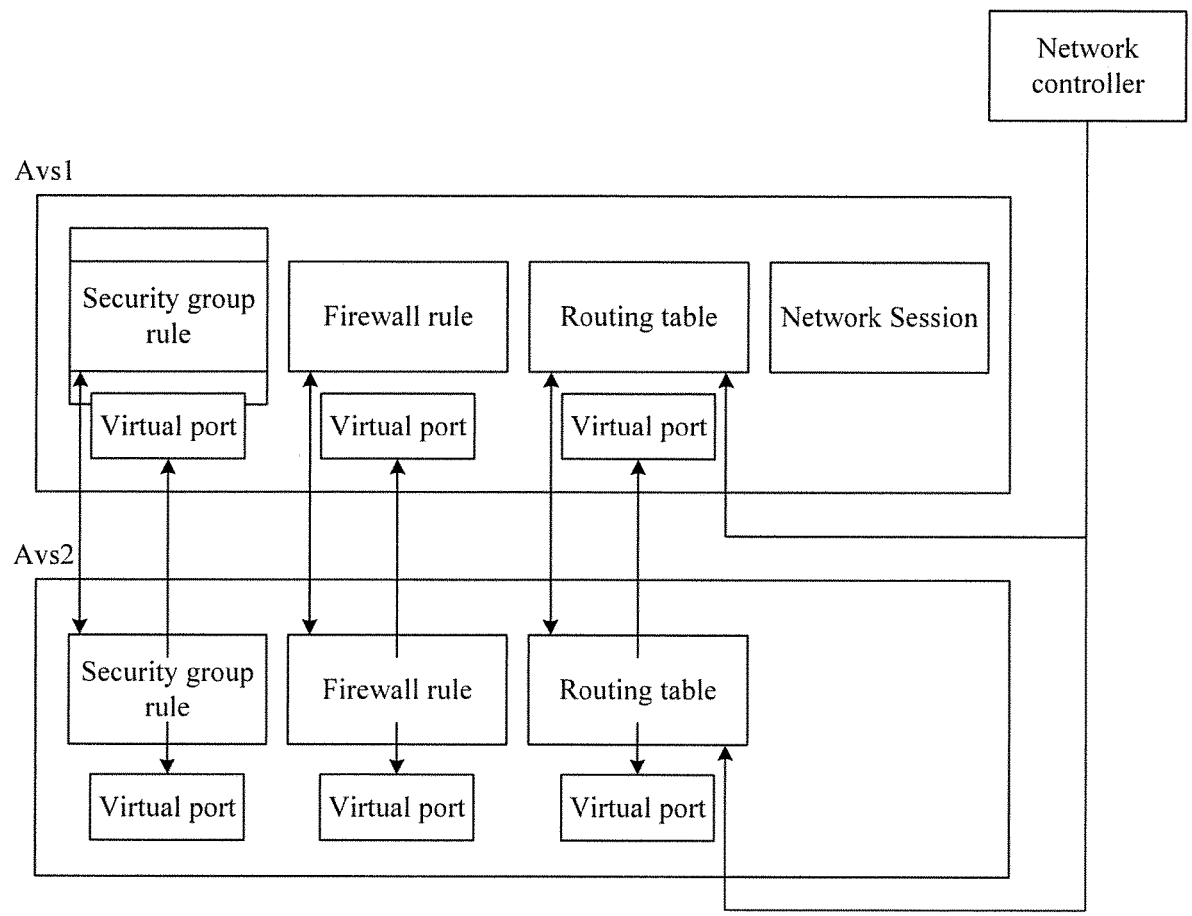
FIG. 4 is a schematic diagram of exemplary static configuration synchronization of a virtual switch, consistent with some embodiments of the present disclosure.
Figure 5:
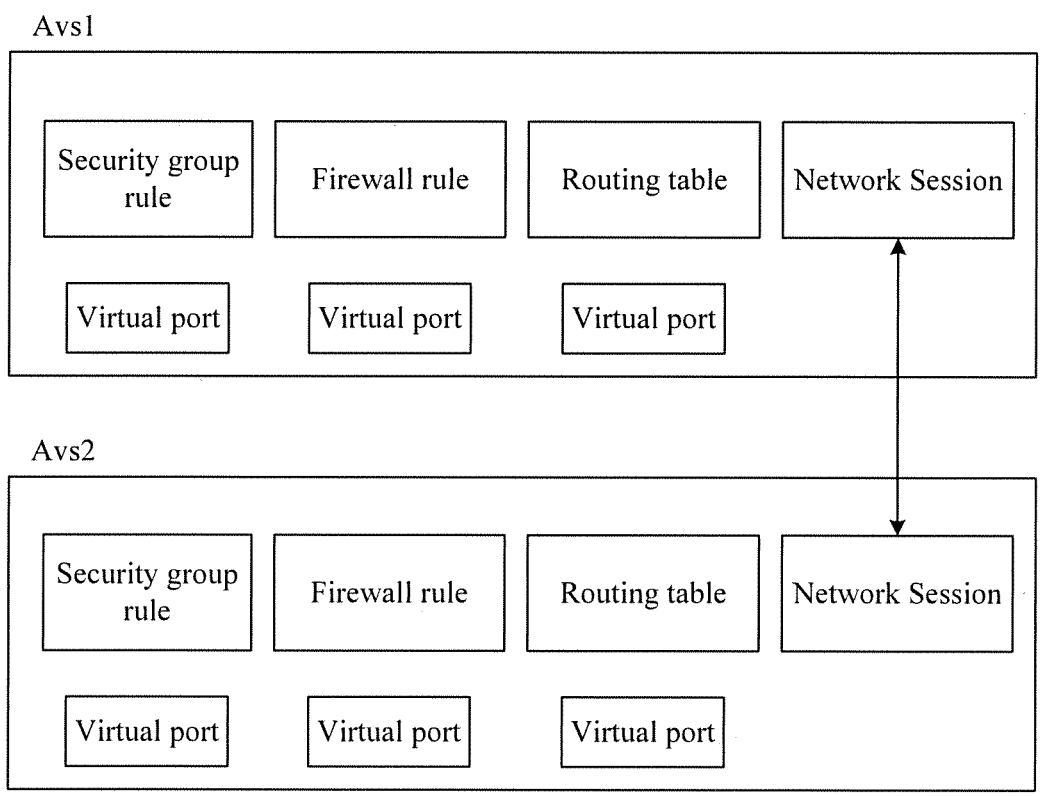
FIG. 5 is a schematic diagram of exemplary dynamic information synchronization of a virtual switch, consistent with some embodiments of the present disclosure.

FIG. 4 is a schematic diagram of exemplary static configuration synchronization of a virtual switch, consistent with some embodiments of the present disclosure. FIG. 5 is a schematic diagram of exemplary dynamic information synchronization of a virtual switch, consistent with some embodiments of the present disclosure. Referring to FIG. 4 and FIG. 5, the virtual switch includes an old module Avs1.ko and a new module Avs2.ko. Avs2.ko is loaded when Avs1.ko is running, but in this case, network traffic is still in Avs1.ko. In some embodiments, a network service configuration of Avs1.ko is synchronized to Avs2.ko by using a Controller, so that the network service configurations of the new module and the old module of the virtual switch are kept consistent.

In the process of synchronizing the network service configurations, if a new network service configuration is delivered to the virtual switch, the new network service configuration is configured in both the new module and the old module, to keep the consistence between the network service configurations of the new module and the old module.

Referring back to FIG. 3, in step 303, the changing dynamic information of the old module is recorded in a process where the dynamic information of the old module constantly changes.

In step 304, the changing dynamic information of the old module is synchronized to the new module.

The second part of the upgrade of the virtual switch is a dynamic information synchronization process. Dynamic information of some network services, such as network address translation and stateful firewall, needs to be kept consistent before and after the upgrade.

In some embodiments, the dynamic information can include a network session, and step 303 can include the following steps.

In step S3031 (not shown in FIG. 3), the network session of the old module is acquired.

In step S3032 (not shown in FIG. 3), the network session with a first state identifier is recorded in a bitmap.

The network session, or referred to as a network connection, contains all information exchanged from end to end on a network, and generally includes bidirectional network traffic and a network session state. The two directions can be, for example, the direction in which a network element A accesses a network element B and the direction in which the network element B accesses the network element A.

In some embodiments, the state change of the network session can be recorded by using a bitmap data structure. Each bit in the bitmap represents a state identifier of one network session, and the bit can be set to dirty or clear. For example, an initial network session in the old module and a network session received during the upgrade are recorded in the bitmap by using dirty as their state identifiers.

In some embodiments, when the upgrade begins and the static configuration of the new module and the static configuration of the old module are synchronized, the network session of the old module is acquired, and is recorded in the bitmap by using a corresponding bit. The first state identifier can be dirty. In initiation, bits of all network sessions are set to dirty.

The upgrading is a hot upgrading, the old module does not stop the receiving and processing of network sessions. Therefore, the state identifiers of the network sessions in the bitmap change when receiving a network session. After one round of copying of the network sessions in the bitmap, some network sessions in the old module are changed, and these network sessions are set to dirty in the bitmap.

It is appreciated that 1 and 0 can be used to represent dirty and clear respectively in the bitmap as long as a network session can be distinguished before and after copying.

In some embodiments, step 304 can include the following steps.

In step S3041 (not shown in FIG. 3), the network session with the first state identifier in the bitmap is copied to the new module; and In step S3042 (not shown in FIG. 3), the first state identifier corresponding to the network session is changed into a second state identifier. The second state identifier can be clear. When network session synchronization is performed between the new module and the old module, a network session identified as dirty in the bitmap is copied to the new module, and the identifier as dirty corresponding to the network session in the bitmap after is set to clear after being copied.

In some embodiments, step 303 can further include the following steps.

In step S3033 (not shown in FIG. 3), the number of network sessions with the first state identifier in the bitmap is determined.

In step S3034 (not shown in FIG. 3), an accumulated time for synchronizing the dynamic information of the new module and the old module is determined.

In step S3035 (not shown in FIG. 3), whether the number is less than a first preset number or whether the accumulated time reaches a preset time (e.g. a time threshold) is determined. If the number is less than the first preset number or the accumulated synchronization time reaches the preset time, step S3036 (not shown in FIG. 3) is performed.

In step S3036, a network session sent to the old module is buffered.

In some embodiments, step 304 can further include the following steps.

In step S3043 (not shown in FIG. 3), all the network sessions with the first state identifier in the bitmap are copied to the new module.

In step S3044 (not shown in FIG. 3), the buffered network session of the old module is sent to the new module.

Because the old module does not stop the receiving and processing of network sessions, the network sessions in the bitmap can always be changing. In some embodiments, it is undesired to repeat the copy operation all the time. Therefore, a decision is provided. One or more conditions are set such that when a preset condition is satisfied in the network session synchronization process, the network session connection synchronization is performed as the last round.

When the last round of network session connection synchronization is performed, network packet processing of the old module is stopped, and all the new network packets are buffered, to ensure that all dirty network sessions have been synchronized to the new module. Because no new network packet is processed, the states of the network sessions in the old module do not change. Therefore, after the last round of synchronization is completed, the network sessions of the new module are consistent with those of the old module.

In some embodiments, the number of dirty network sessions in the bitmap can be calculated, or a time when synchronization of the network sessions of the new module and the old module begins can be calculated for determining whether to perform the last round of network session synchronization.

After network packet processing of the old module is stopped, all the dirty network sessions in the bitmap continue to be copied to the new module. In addition, the buffered network session of the old module can further be sent to the new module, so that the network sessions on the new module are kept consistent with those on the old module.

In some embodiments, step 303 can further include the following step.

In step S3037 (not shown in FIG. 3), whether the number is greater than a second preset number is determined if the number is greater than or equal to the first preset number and the accumulated synchronization time does not reach the preset time. If the number is greater than the second preset number, step S3041 is performed.

If the number of dirty network sessions in the bitmap is less than the first preset number or the accumulated synchronization time has reached the preset time, the last stage of the network session synchronization is entered. If neither of the above conditions is met, copying dirty network sessions in the bitmap to the new module can be repeatedly performed, that is, a cyclic operation is entered to begin the next round of network session synchronization.

Moreover, copying dirty network sessions in the bitmap to the new module is performed each time there is a dirty network session. To avoid excessive times of copying, one additional condition can be provided in some embodiments. Specifically, only when the number of dirty network sessions in the bitmap exceeds the second preset number, does the next round of network session synchronization begin to repeat copying dirty network sessions in the bitmap to the new module, performing step S3041.

In some embodiments, instead of all of the network sessions, a selected amount of network sessions can be synchronized to reduce processing time.

It is appreciated that, the first preset number and the second preset number can be set according to a proportion in the total number of network sessions in the old module, for example, 10% and 8%. The first preset number and the second preset number can also be set to fixed values. In addition, the values of the first preset number and the second preset number can be set to be the same or different as required.

Figure 6:
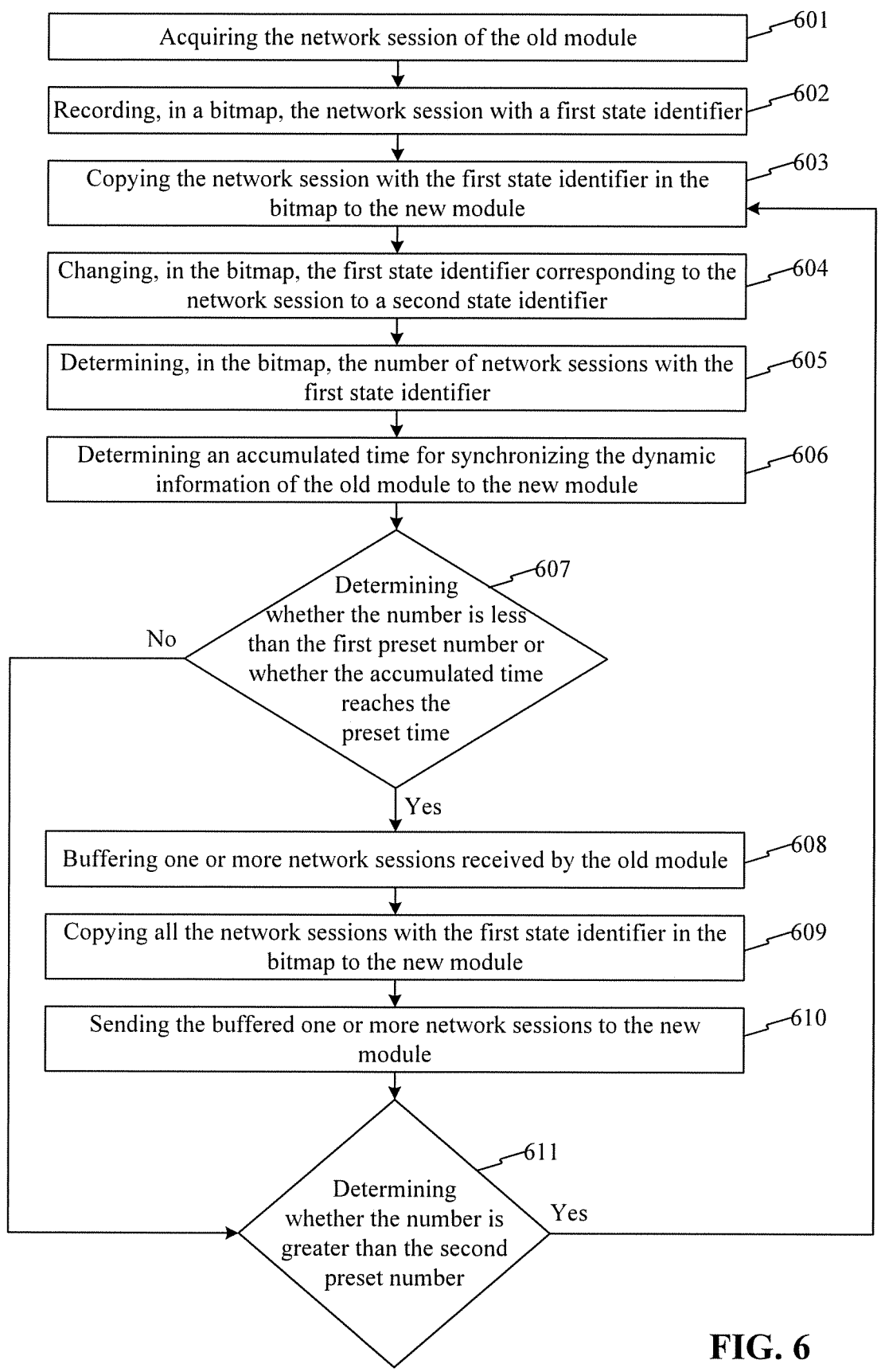
FIG. 6 is a flowchart of exemplary network session synchronization of a virtual switch, consistent with some embodiments of the present disclosure.

FIG. 6 is a flowchart of exemplary network session synchronization of a virtual switch, consistent with some embodiments of the present disclosure. The network session synchronization can include the following steps.

In step 601, the network session of the old module is acquired.

In step 602, the network session with a first state identifier is recorded in a bitmap.

In step 603, the network session with the first state identifier in the bitmap is copied to the new module.

In step 604, the first state identifier corresponding to the network session is changed into a second state identifier.

In step 605, the number of network sessions with the first state identifier in the bitmap is determined.

In step 606, an accumulated synchronization time for synchronizing the dynamic information between the new module and the old module is determined.

In step 607, whether the number is less than the first preset number or whether the accumulated synchronization time reaches the preset time is determined. If the number is less than the first preset number or the accumulated synchronization time reaches the preset time, step 608 is performed. If the number is greater than or equal to the first preset number and the accumulated synchronization time does not reach the preset time, step 611 is performed.

In step 608, a network session sent to the old module is buffered.

In step 609, all the network sessions with the first state identifier in the bitmap is copied to the new module.

In step 610, the buffered network session of the old module is sent to the new module.

In step 611, whether the number is greater than the second preset number is determined. If the number is greater than the second preset number, step 603 is performed.

FIG. 7 is a schematic diagram of exemplary pseudo-code of network session synchronization, consistent with some embodiments of the present disclosure. In the new module Avs2 of this example, when bitmap.dirty_num> threshold, that is, the number of dirty network sessions in the bitmap reaches the preset threshold, a network session copy operation is performed, and the state identifiers of the network sessions in the bitmap that have been copied are changed from dirty to clear. The old module Avs1 of this example continuously captures new network sessions, writes the captured network sessions to the bitmap, and sets the network sessions to dirty.

Referring back to FIG. 3, in step 305, when the dynamic information is received on the virtual switch, the dynamic information is sent to the new module to which the static configuration and the dynamic information of the old module have been synchronized.

After the upgrade of the virtual switch is completed, the network traffic is directed to the new module of the virtual switch. The network traffic, or referred to as a flow, is represented by an n-tuple in a network packet in one direction from end to end. The n-tuple is generally a 5-tuple.

In some embodiments, the new module can have a designated interface, and Step 305 can include the following steps.

In step S3051 (not shown in FIG. 3), a processing function pointer on the virtual switch is switched to the designated interface of the new module.

In step S3052 (not shown in FIG. 3), the network traffic is sent to the new module through the designated interface when the network traffic is received on the virtual switch.

In some embodiments, processing function pointers of all network packets are switched to the designated interface of the new module, so that new network packets are processed through the new module of the virtual switch. Thus, the hot upgrading ends.

In some embodiments, when a new module is loaded on a virtual switch for upgrade, static configurations and dynamic information of the new module and an old module of the virtual switch are synchronized. After the upgrade, network traffic of the virtual switch is redirected from the old module to the new module. During the hot upgrade, the dynamic information of the old module of the virtual switch still constantly changes while consistency between dynamic information of an old module and dynamic information of a new module is maintained. The virtual switch can synchronize the changing dynamic information of the old module to the new module while allowing the old module to continue receiving and processing the dynamic information, so that the dynamic information of the new module and that of the old module are always consistent with each other, thereby achieving smooth upgrade of the virtual switch.

FIG. 8A is a schematic diagram of exemplary network session synchronization of a virtual switch, consistent with some embodiments of the present disclosure. A bitmap-based upgrading method for a virtual switch is described below in an example.

During the upgrade of the virtual switch, a new module is loaded on the virtual switch, and then a static configuration and dynamic information of the new module are synchronized with those of the old module. A dynamic information configuration process is as shown below.

Network sessions of the old module are acquired, and the network sessions are recorded in a bitmap, specifically as shown in FIG. 8A. Network sessions 1-4 in the old module are recorded in the bitmap, and are recorded as "1" because the network sessions have not been synchronized to the new module.

FIG. 8B is another schematic diagram of exemplary network session synchronization of a virtual switch, consistent with some embodiments of the present disclosure. After the network sessions in the old module are acquired in the bitmap, the network sessions recorded as "1" in the bitmap are copied to the new module. Because the network sessions have been synchronized to the new module, their states in the bitmap are changed from "1" to "0", specifically as shown in FIG. 8B.

FIG. 8C is another schematic diagram of exemplary network session synchronization of a virtual switch, consistent with some embodiments of the present disclosure. In some embodiments, the network connection of the old module is not interrupted, and the dynamic information of the old module still constantly changes. Therefore, in the process of copying the network sessions of the old module to the new module, some network sessions can change, and their states are set from "0" back to "1", specifically as shown in FIG. 8C.

The network session set from "0" back to "1" in the old module continues being copied to the new module. To avoid getting stuck in a loop, the accumulated synchronization time between the new module and the old module and the number of network sessions identified as "1" in the bitmap are determined. When the accumulated synchronization time between the new module and the old module reaches the preset time (for example, 30 minutes) or the number of network sessions identified as "1" in the bitmap exceeds the preset threshold (for example, 100), the network connection of the old module can be interrupted and the old module stops processing the network sessions. Therefore, the network sessions of the old module stop changing. The network session sent to the old module is buffered. The network sessions identified as "1" in the bitmap are copied to the new module. Finally, the buffered network session is sent to the new module. Thus, the synchronization between the new module and the old module is completed. If the accumulated synchronization time between the new module and the old module does not reach the preset time or the number of network sessions identified as "1" in the bitmap does not exceed the preset threshold, the network sessions identified as "1" in the bitmap to the new module continues to be copied.

FIG. 8D is another schematic diagram of exemplary network session synchronization of a virtual switch, consistent with some embodiments of the present disclosure. After the synchronization is completed, all the network sessions of the old module are switched to a designated interface of the new module. Thus, the upgrade of the virtual switch ends. The bitmap after the synchronization is completed is specifically as shown in FIG. 8D.

Figure 8E:
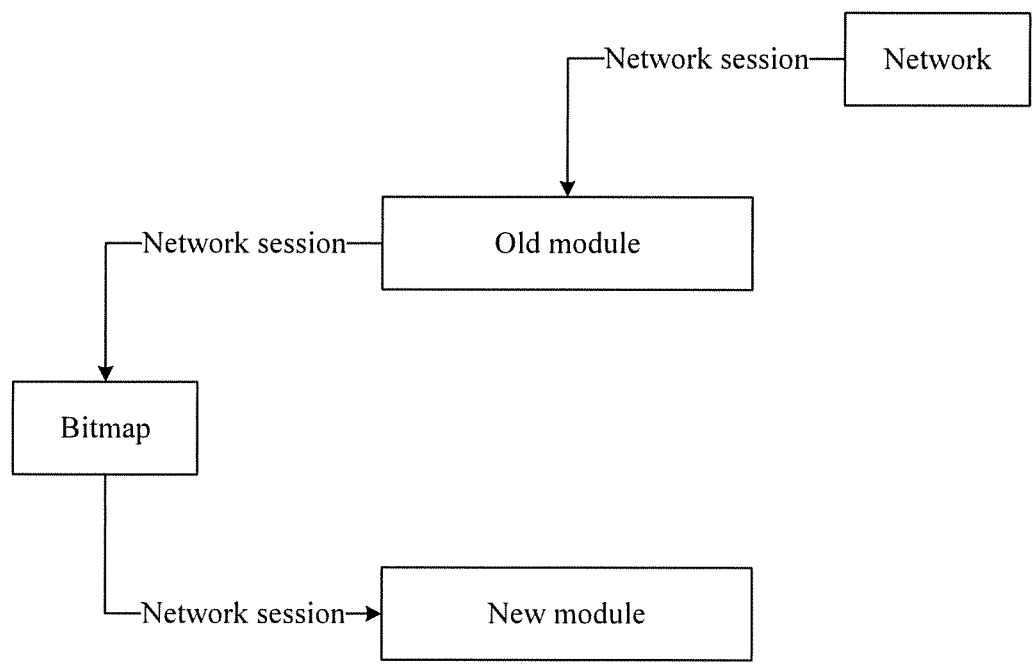
FIG. 8E is another schematic diagram of exemplary network session synchronization of a virtual switch, consistent with some embodiments of the present disclosure.

FIG. 8E is another schematic diagram of exemplary network session synchronization of a virtual switch, consistent with some embodiments of the present disclosure. During the synchronization between the old module and the new module the virtual switch, to achieve hot upgrading, the old module continuously receives network sessions from the network, and the new network sessions cause a change in the bitmap. Before the last round of network session synchronization, the bitmap is used for synchronization of the new module. Because receiving and processing of network sessions by the old module do not need to be interrupted, hot upgrading of the virtual switch can be achieved.

Figure 9:
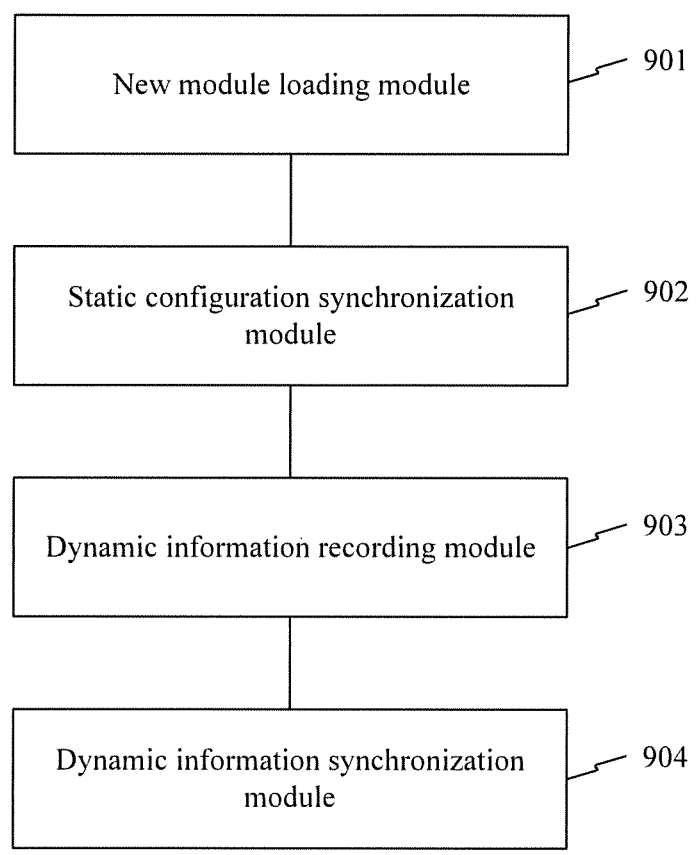
FIG. 9 is a structural block diagram of an upgrading device for a virtual switch, consistent with some embodiments of the present disclosure.

FIG. 9 is a structural block diagram of an upgrading device for a virtual switch, consistent with some embodiments of the present disclosure. The virtual switch can include an old module, and the device can include a new module loading module 901, a static configuration synchronization module 902, a dynamic information recording module 903 and a dynamic information synchronization module 904.

New module loading module 901 is configured to load a new module on the virtual switch.

Static configuration synchronization module 902 is configured to synchronize a static configuration of the new module and the static configuration of the old module.

In some embodiments, the static configuration can include a network service configuration, and the static configuration synchronization module 902 can include the following submodules.

A network service configuration obtaining submodule is configured to obtain the network service configuration of the old module.

A network service configuration synchronization submodule is configured to synchronize the network service configuration of the old module to the new module.

In some embodiments, the static configuration synchronization module 902 can further include the following submodules.

A new network service configuration synchronization submodule is configured to, when the network service configuration of the old module receives a new network service configuration, synchronize the new network service configuration to the new module.

A dynamic information recording module 903 is configured to record, in a process where the dynamic information of the old module constantly changes, the changing dynamic information of the old module.

A dynamic information synchronization module 904 is configured to synchronize the changing dynamic information of the old module to the new module.

In some embodiments, the dynamic information includes a network session, and the dynamic information recording module 903 can include the following submodules.

A network session acquiring submodule is configured to acquire the network session of the old module.

A network session recording submodule is configured to record the network session with a first state identifier in a bitmap.

In some embodiments, the dynamic information synchronization module 904 can include the following submodules.

A first session copying submodule is configured to copy the network session with the first state identifier in the bitmap to the new module.

A first identifier changing submodule is configured to change the first state identifier corresponding to the network session into a second state identifier.

In some embodiments, the dynamic information recording module 903 can include the following submodules.

A session number calculation submodule is configured to determine the number of network sessions with the first state identifier in the bitmap.

An accumulated synchronization time calculation submodule is configured to determine an accumulated synchronization time for synchronizing the dynamic information of the new module and the old module.

A first determining submodule is configured to determine whether the number is less than a first preset threshold or whether the accumulated synchronization time reaches a preset time, and invoke a session buffering submodule if the number is less than the first preset threshold or the accumulated synchronization time reaches the preset time, or invoke a second determining submodule if the number is greater than or equal to the first preset threshold or the accumulated synchronization time does not reach the preset time. The session buffering submodule is configured to buffer a network session sent to the old module.

In some embodiments, the dynamic information recording module 903 can include the following submodules.

The second determining submodule is configured to determine whether the number is greater than a second preset threshold and invoke the first session copying submodule.

In some embodiments, the dynamic information synchronization module 904 can include the following submodules.

A second session copying submodule is configured to copy all the network sessions with the first state identifier in the bitmap to the new module.

A buffered session sending submodule is configured to send the buffered network session of the old module to the new module.

In some embodiments according to the present disclosure, a network traffic switching module is configured to send, when network traffic is received on the virtual switch, the network traffic to the new module to which the static configuration and the dynamic information of the old module have been synchronized.

In some embodiments, the new module can have a designated interface, and the network traffic switching module can include the following submodules.

A designated interface switching submodule is configured to redirect a processing function pointer on the virtual switch to the designated interface of the new module.

A network traffic sending submodule is configured to send the network traffic to the new module through the designated interface when the network traffic is received on the virtual switch.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

It is appreciated that all or some of the procedures in the methods of the foregoing embodiments can be implemented by a program instructing relevant hardware components of a terminal device (for example, an upgrading device). The program can be stored in a computer readable storage medium. The storage medium includes a flash memory, a Read-Only Memory (ROM), a Random Access Memory (RAM), a magnetic disk, or an optical disc.

In a typical configuration, the computer device includes one or more central processing units (CPUs), input/output interfaces, network interfaces, and memories. The memory can include the following forms of a computer readable medium: a volatile memory, a RAM or a non-volatile memory, for example, a ROM or flash RAM. The memory is an example of the computer readable medium. The computer readable medium includes volatile and non-volatile, mobile and non-mobile media, and can use any method or technology to store information. The information can be a computer readable instruction, a data structure, a module of a program or other data. Examples of storage media of the computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be used for storing computer accessible information. The computer readable medium does not include transitory computer readable media (transitory media), for example, a modulated data signal and carrier.

The embodiments of the present disclosure are described with reference to flowcharts or block diagrams of the method, terminal device (system) and computer program product. It should be understood that computer program instructions can implement each process or block in the flowcharts, or block diagrams, and a combination of processes or blocks in the flowcharts or block diagrams. These computer program instructions may be provided to a general-purpose computer, a special-purpose computer, an embedded processor or a processor of another programmable data processing device to generate a machine, so that an apparatus configured to implement functions specified in one or more processes in the flowcharts or one or more blocks in the block diagrams is generated by using instructions executed by the computer or the processor of another programmable data processing terminal device.

These computer program instructions may also be stored in a computer readable memory that can guide a computer or another programmable data processing terminal device to work in a specified manner, so that the instructions stored in the computer readable memory generate a product including an instruction apparatus, where the instruction apparatus implements functions specified in one or more processes in the flowcharts or one or more blocks in the block diagrams.

These computer program instructions may also be loaded into a computer or another programmable data processing terminal device, so that a series of operation steps are performed on the computer or another programmable data processing terminal device to generate processing implemented by a computer, and instructions executed on the computer or another programmable data processing terminal device provide steps for implementing functions specified in one or more processes in the flowcharts or one or more blocks in the block diagrams.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

What is claimed is:

1. A method for upgrading a virtual switch, the method comprising:
    loading a first module on the virtual switch, wherein the virtual switch comprises a second module, the second module comprising a static configuration and dynamic information, the dynamic information of the second module changes during the upgrading of the virtual switch;
    synchronizing the static configuration of the second module to the first module;
    recording the changing dynamic information of the second module;
    synchronizing the changing dynamic information of the second module to the first module; and
    in response to the static configuration and the changing dynamic information of the second module having been synchronized to the first module, directing network flows received by the virtual switch to the first module.

2. The method according to claim 1, wherein synchronizing the static configuration of the second module to the first module comprises:
    obtaining a current network service configuration of the second module; and
    synchronizing the current network service configuration of the second module to the first module.

3. The method according to claim 2, wherein synchronizing the static configuration of the second module to the first module further comprises:
    in response to a new network service configuration being received by the second module, synchronizing the new network service configuration to the first module.

4. The method according to claim 1, wherein the dynamic information of the second module comprises a network session, and wherein recording the changing dynamic information of the second module comprises:
    acquiring the network session of the second module; and
    recording, in a bitmap, the network session with a first state identifier.

5. The method according to claim 4, wherein synchronizing the changing dynamic information of the second module to the first module comprises:
    copying the network session with the first state identifier in the bitmap to the first module; and
    changing, in the bitmap, the first state identifier corresponding to the network session to a second state identifier.

6. The method according to claim 4, wherein the bitmap comprises a plurality of recorded network sessions, and wherein recording the changing dynamic information of the second module further comprises:
    determining, in the bitmap, the number of network sessions with the first state identifier;

determining an accumulated time for synchronizing the dynamic information of the second module to the first module; and in response to at least one of a determination that the number of network sessions with the first state identifier is less than a first preset number or a determination that the accumulated time is equal to or greater than a preset time threshold, buffering one or more network sessions received by the second module.

7. The method according to claim 6, further comprising:
in response to the number of network sessions with the first state identifier being determined to be greater than or equal to the first number and the synchronization time being determined to be less than the preset time threshold, determining whether the number of network sessions with the first state identifier is greater than a second preset number; and in response to a determination that the number of network sessions with the first state identifier is greater than the second preset number, copying the network sessions with the first state identifier in the bitmap to the first module.

8. The method according to claim 6, wherein after the one or more network sessions received by the second module are buffered, synchronizing the changing dynamic information of the second module to the first module comprises:
copying all the network sessions with the first state identifier in the bitmap to the first module; and
sending the buffered one or more network sessions to the first module.

9. The method according to claim 1, wherein directing network flows received by the virtual switch to the first module comprises:
switching a processing function pointer of the virtual switch to an interface of the first module; and
sending the network flows to the first module through the interface.

10. A device for upgrading a virtual switch, the device comprising:
a memory storing a set of instructions; and
one or more processors configured to execute the set of instructions to cause the device to perform:
loading a first module on the virtual switch, wherein the virtual switch comprises a second module, the second module comprising a static configuration and dynamic information, the dynamic information of the second module changes during the upgrading of the virtual switch;
synchronizing a static configuration of the second module to the first module;
recording the changing dynamic information of the second module;
synchronizing the changing dynamic information of the second module to the first module; and
in response to the static configuration and the changing dynamic information of the second module having been synchronized to the first module, directing network flows received by the virtual switch to the first module.

11. The device according to claim 10, wherein the static configuration of the second module comprises a network service configuration, and the one or more processors are configured to execute the set of instructions to cause the device to further perform:
obtaining a current network service configuration of the second module; and synchronizing the current network service configuration of the second module to the first module.

12. The device according to claim 11, wherein the one or more processors are configured to execute the set of instructions to cause the device to further perform:
in response to a new network service configuration being received by the second module, synchronizing the new network service configuration to the first module.

13. The device according to claim 10, wherein the dynamic information of the second module comprises a network session, and the one or more processors are configured to execute the set of instructions to cause the device to further perform:
acquiring the network session of the second module; and
recording, in a bitmap, the network session with a first state identifier.

14. The device according to claim 13, wherein the one or more processors are configured to execute the set of instructions to cause the device to further perform:
copying the network session with the first state identifier in the bitmap to the first module; and
changing, in the bitmap, the first state identifier corresponding to the network session to a second state identifier.

15. The device according to claim 13, wherein the bitmap comprises a plurality of recorded network sessions, and the one or more processors are configured to execute the set of instructions to cause the device to further perform:
determining, in the bitmap, the number of network sessions with the first state identifier;
determining an accumulated time for synchronizing the dynamic information of the second module to the first module; and
in response to at least one of a determination that the number of network sessions with the first state identifier is less than a first preset number or a determination that the accumulated time is equal to or greater than a preset time threshold, buffering one or more network sessions received by the second module.

16. The device according to claim 15, wherein the one or more processors are configured to execute the set of instructions to cause the device to further perform:
in response to the number of network sessions with the first state identifier being determined to be greater than or equal to the first threshold and the accumulated time being determined to be less than the preset time threshold, determining whether the number of network sessions with the first state identifier is greater than a second preset number; and in response to a determination that the number of network sessions with the first state identifier is greater than the second preset number, copying the network sessions with the first state identifier in the bitmap to the first module.

17. The device according to claim 15, wherein after the one or more network sessions received by the second module are buffered, the one or more processors are configured to execute the set of instructions to cause the device to further perform:
copying all the network sessions with the first state identifier in the bitmap to the first module; and
sending the buffered one or more network sessions to the first module.

18. The device according to claim 10, wherein the one or more processors are configured to execute the set of instructions to cause the device to further perform:
switching a processing function pointer of the virtual switch to an interface of the first module; and sending the network flows to the first module through the interface.

19. A non-transitory computer readable medium that stores a set of instructions that is executable by a controller to cause the controller to perform a method for upgrading a virtual switch, the method comprising:
- loading a first module on the virtual switch, wherein the virtual switch comprises a second module, the second module comprising a static configuration and dynamic information, the dynamic information of the second module changing during the upgrading of the virtual switch;
- synchronizing the static configuration of the second module to the first module;
- recording the changing dynamic information of the second module;
- synchronizing the changing dynamic information of the second module to the first module; and
- in response to the static configuration and the changing dynamic information of the second module have been synchronized to the first module, directing network flows received by the virtual switch to the first module.

20. The non-transitory computer readable medium of claim 19, wherein the synchronizing the static configuration of the second module to the first module comprises:
- obtaining a current network service configuration of the second module; and
- synchronizing the current network service configuration of the second module to the first module.

* * * * *